United States Patent [19]
Wichterle

[11] 3,861,416
[45] Jan. 21, 1975

[54] HEART VALVE
[75] Inventor: Otto Wichterle, Praha, Czechoslovakia
[73] Assignee: Ceskoslovenska akademie ved, Praha, Czechoslovakia
[22] Filed: Jan. 29, 1973
[21] Appl. No.: 327,440

[30] Foreign Application Priority Data
Feb. 1, 1972 Czechoslovakia .............. 61772-72

[52] U.S. Cl............. 137/525.3, 3/DIG. 3, 251/368
[51] Int. Cl............................................ F16k 15/14
[58] Field of Search.......... 137/525.1, 525.3, 525.5, 137/525.7, 512.4, 527, 527.6, 527.8; 3/DIG. 3; 264/343

[56] References Cited
UNITED STATES PATENTS

| | | | |
|---|---|---|---|
| 2,644,663 | 7/1953 | Klingler | 137/525.1 |
| 2,670,757 | 3/1954 | Delaney | 137/525.1 X |
| 2,822,819 | 2/1958 | Geeraert | 3/DIG. 3 |
| 3,320,972 | 5/1967 | High et al. | 137/525.1 |
| 3,361,858 | 1/1968 | Wichterle | 264/343 X |
| 3,445,916 | 5/1969 | Schulte | 3/DIG. 3 |
| 3,579,642 | 5/1971 | Heffernan et al. | 137/525.1 X |
| 3,689,942 | 9/1972 | Rapp | 3/DIG. 3 |
| 3,717,883 | 2/1973 | Mosher | 137/525.5 X |
| 3,726,446 | 4/1973 | Hays | 137/525.3 X |

*Primary Examiner*—William R. Cline
*Attorney, Agent, or Firm*—Murray Schaffer

[57] ABSTRACT

A heart valve and method of making the same, the valve regulating the flow of fluid in a body passage. The valve comprises a substantially circular body having an outer ring portion and at least two interior flap portions. Each flap portion is pivotally secured to the ring along an axis represented by chords of the ring and being flexible to pivot in response to the flow of fluid in the passage. Means are located on each flap portion which are adapted to engage the wall of the ring portion to limit movement of the flap in one direction. The flaps are cooperatively shaped to close the interior of said body when they are pivoted in the one direction to their limit.

12 Claims, 5 Drawing Figures

HEART VALVE

BACKGROUND OF THE INVENTION

The present invention relates to a valve for regulating the flow of fluid in body passages and in particular to an artificial heart valve, its use and its method of production.

Artificial valves used for the regulation of the flow of fluid in body passages are becoming more common as surgical and medicinal practices improve. Such valves are implanted in the body and are designed to function under normal body conditions in a similar manner to the actual valve they are intended to replace. Virtually all artificial heart valves used at the present time are characterized by a lateral flow of blood in contradistinction to the axial flow in the natural heart or arterial valves. The known artificial valves have a disadvantage in that they create a high degree of turbulence caused by the lateral flow which unnaturally influences the normal course of blood flow and blood pressure.

All of the known valves including the well-known valves designed by Star-Edwards, described in Vol. 154 Ann.Surg. page 726 (1961); Gott, Vol. 48 J. of Thoracic and Cardiovascular Surgery page 713 (1964); and Alvarez, Vol. 92 Revista Clinica Espanola page 322 (1964), are also characterized by having at least one hard seat against which the valve member abuts. These devices therefore having an additional disadvantage in that during the repeated operation of the valve member the bruising and destruction of red blood corpuscles occur.

The only artificial heart valve having a central or axial flow was designed by Bolf Czechoslovak Pat. No. 118,336, May 5, 1966, as an analogy of the aortal valve. Because this valve was constructed to simulate the natural valve a reliable functioning only occurs when a highly strong rubber material is used as the valve member. This construction, however, has the disadvantage in that it permits the blood to coagulate easily and consequently tends to occlude the body passage.

It is an object of the present invention to provide a valve for the regulation of the flow of fluid in body passages which overcomes the disadvantages of the prior art devices.

It is a further object of the present invention to provide an artificial heart valve in which the flow of blood in the body passage directly regulates its operation.

It is another object of the present invention to provide an artificial heart valve which as an axial flow characteristic similar to the natural heart valve.

It is a further object of the present invention to provide a heart valve composed of material compatible to the body.

It is a further object of the present invention to provide a novel method for the construction of artificial heart valves as well as a novel method and system for their use.

The foregoing objects, others, as well as the numerous advantages of the present invention, will be seen from the following disclosure of the preferred embodiment of the present invention.

SUMMARY OF THE INVENTION

According to the present invention, a valve for regulating the flow of fluid in the body passage is formed comprising a substantially circular body having an outer ring portion and at least two interior flap portions. Each of the flap portions are pivotally secured to the ring along an axis represented by the chords of the ring so as to be adapted to pivot in response to the axial flow of fluid through the body passage. Each flap is provided with means which are adapted to engage the wall of the ring portion which limits the movement of the flap in one direction and they are also cooperatively shaped to close the interior of the body when the flaps are pivoted in this one direction to their limit of movement.

In accordance with the invention, the valve when placed in the body passage has at least two mobile flaps which may swing in two directions. The flaps swing open about the chordal axis in response to the normally desired flow direction, but swing shut on reverse flow. The extent of movement in the direction of reverse flow of fluid is, however, limited by stop means. In this limited or stopped position the various flexible bodies are held by the wall of the outer ring so that they come in contact with each other along their free edges closing the interior of the valve.

Preferably, the flaps are provided with thin walls or ridges which extend perpendicularly from the plane of the face of the flap on the side of the valve subject to the reverse flow of fluid. Preferably, these walls or ridges are formed like thin flexible blades of a soft elastic material and are adapted to constitute foils readily subject to the flow of fluid. The blades act to cause the flaps to move quickly and effectively into the closed position. Preferably, the thin elastic blade-like walls or ridges are formed along the peripheral edges of each of the flaps so that when the flaps close in contiguous contact they seal or close against each other and by having the blades abut with each other they form peripheral seals about each of the individual flaps so as to present a solid valve bulkhead.

Preferably, the flaps are integrally secured to the ring portion along the chordal axis by means of a thin suspension hinge also made from a flexible material. This elastic material thus forms a continuous hinge which is sealed along the entire length of the chord.

The valve body and the flaps may be reinforced with fibrous material such as a woven or non-woven web which material is oriented in predominantly the radial direction of the body. The reinforcement acts to strengthen the hinge portion and permits it to repeatedly flex and pivot over an indefinite period of time without fear of tearing or breaking.

It is also preferred that the ring member, the flaps and the intermediate hinge portions be made of the same material, preferably, somewhat elastic and highly flexible. A strongly swollen hydrophilic gel has been found quite suitable. Such hydrophilic material provides for soft seating faces for the valve members which avoid bruising of blood corpuscles and a high degree of compatibility with the body as well. When the valve is made of hydrophilic material, an annular shape retaining member may preferably be used as a reinforcing device to provide the peripheral ring portion of the body with sufficient stability.

The valve may also be made of a natural or synthetic rubber or moldable plastic material of the types quite commonly used in medical and surgical devices. In forming the valve from a rubber or plastic material the material is introduced into a mold representing the negative of a slightly open valve. Preferably, the oriented textile reinforcement for the flap is placed in the mold spaced from its walls, prior to the introduction of the rubber material. The material is then pressed and formed into the desired shape.

The valve can also be produced by casting the mixture of hydrophilic monomers, inert solvent and polymerization catalysts into a mold which also represents a negative of the slightly open valve. In this case the reinforcing peripheral ring and the radially oriented fibers are located in the mold prior to the introduction of the monomer mixture. The monomers are then subjected to polymerization in situ in the mold. The proportion between monomers and the solvent is chosen so that the volume fraction of the monomer in the mixture is the same or higher than the volume fraction of the completed polymer in an equilibrium swollen state when it is placed in the working medium, i.e., the fluid in the body passage. Thus there may be produced a valve having a prefixed and preshaped form such as that which it is desired to have under the exact working conditions.

The valve formed according to the present invention has essentially an axial flow characteristic and is reliable in operation within the body passage, even though it may be made from a material which is mechanically less anti-thrombogenic. Such material as would be strongly swollen in water (e.g. certain hydrophilic gels) to be expected normally to be less resistant.

The valve of the present invention is designed according to the principle that the individual flexing flaps are closed automatically and in direct response to the flow of fluid in the body passage in one direction, i.e., the reverse flow direction to that normally desired. The position of the flaps in the closed or sealed condition is defined not only by the mutual contact of the peripheral edges of the flaps, as is the case in Bolf's valve, but also in accordance with the present invention by the stop means which limits the reverse flexing or pivoting of the flap. The stop means provides the flap with a secure and independent means which limits their reverse movement. Preferably in the closed position, the flaps take an orientation which is in a plane lying parallel to the plane of the circular body. This is achieved advantageously by shaping the flaps in a way that an enlarged massive part of low compressibility or low elasticity is formed which is adapted to engage a correspondingly non-elastic portion on the interior wall of the peripheral ring. The ring portion itself may be non-elastically formed either with the reinforcing insert or by the proper choice of a material having a mechanically low compressibility.

Full details of the present invention are set forth in the following description in which reference is made to the accompanying drawings.

DESCRIPTION OF THE INVENTION

Figure 1:
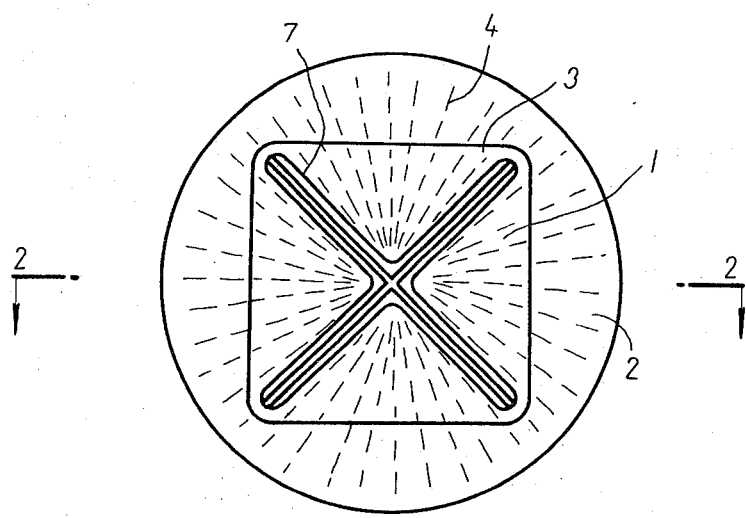
FIG. 1 is a bottom plan view of the valve of the present invention shown in closed condition.

Turning now to the figures, the valve according to the present invention is made in the form of a substantially circular disc-like body having a plurality of flexing flaps 1 secured symmetrically in an outer ring 2 by means of thin hinge-like suspensions 3. The hinge suspensions 3 are arranged along axes representing chords of the body.

Embedded within the material and extending through the mobile flaps 1 and the ring-like body 2 is a reinforcement 4 made of a fibrous material. The reinforcement 4 is a radially oriented array of a plurality of multi-fibrous or monofilament threads or a woven or non-woven web of such threads. The reinforcing material is anchored in an axial direction within the annular ring portion 2 and extends in a radial direction through the hinge suspension 3 into each of the mobile flap portions 1. The fibrous reinforcing material 4 thus extends substantially uniformly through the body of the valve and interconnects the ring portion and the flap portions.

Figure 2:
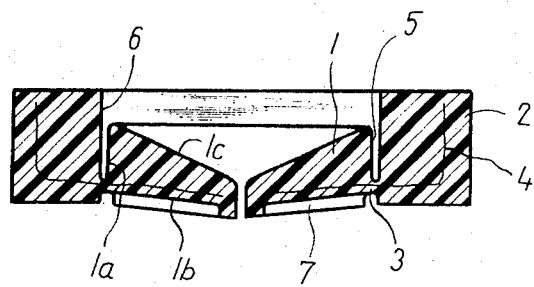
FIG. 2 is a sectional view taken along line 2—2 of FIG. 1.
Figure 5:
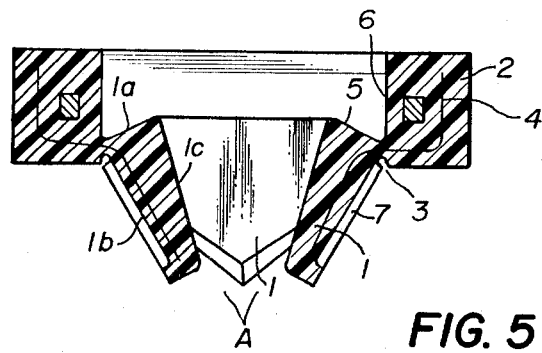
FIG. 5 is a sectional view showing another embodiment of the present invention having a reinforcing collar in the ring portion.

As seen in FIG. 2, the valve, in closed condition, is such that the flaps 1 lie in a plane substantially coextensive with that of the ring portion 2. In cross-section each of the flaps are somewhat like a right triangle having a base 1a attached to the hinge suspension 3, a perpendicular leg 1b and hypotenuse 1c. The perpendicular leg 1b lies on the side facing the reverse flow condition of the valve. The base 1a of each of the flaps have an enlarged area 5 which is adapted to abut against the inner wall 6 of the exterior ring 2. The portion 5 and the face 6 of the ring 2 are preferably formed of a material having a low compressibility or are suitably reinforced by an insert of hard material. The portions 5 and 6 are adapted to abut against each other when the reverse flow of fluid causes the flap members 1 to move into the position shown in FIG. 2.

Figure 3:
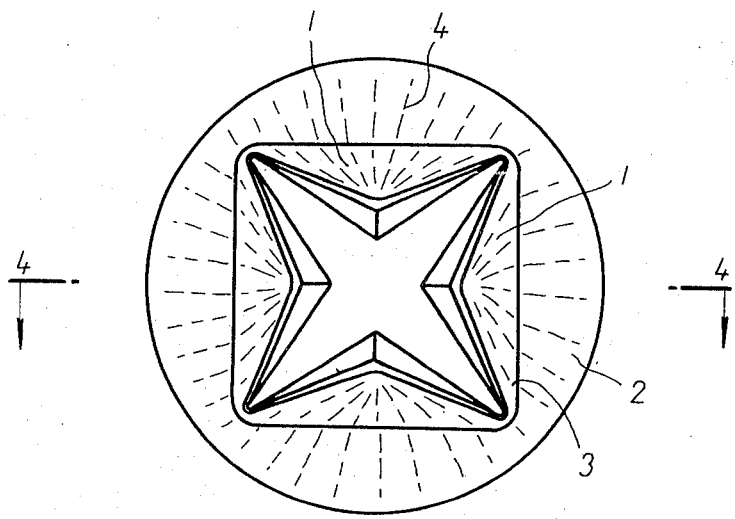
FIG. 3 is a top plan view of the valve shown in FIG. 1.
Figure 4:
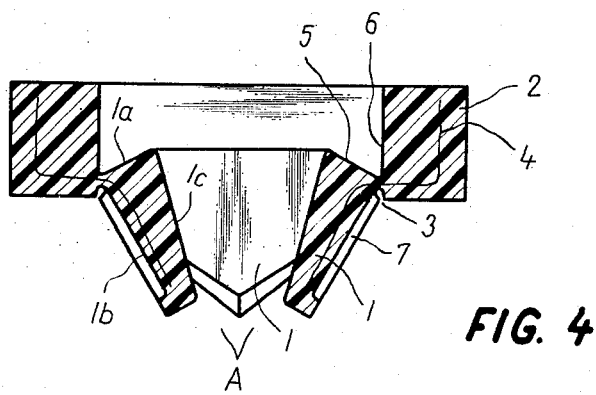
FIG. 4 is a sectional view taken along line 4—4 of FIG. 3.

As seen in FIG. 1, in plan view the flap members are also triangular and are four in number. The triangular members are congruent to each other and the hinge suspensions 3 lie along their basis which are in fact coincident with the chord. The peripheral arms of the triangles are shaped and dimensioned so that they fit together in the closed position. (FIG. 1) As seen in FIGS. 3 and 4 the valve is opened by flowing fluid in the direction of arrow A which flexes the flap members 1 about the hinge suspension 3 with only minimal resistance.

To achieve an absolutely perfect closing of the valve the flaps 1 are provided with thin flexible blade-like walls or ridges 7 which extend along the free peripheral edges, comprising the contact edges of each of the triangular shaped flap members. The blade-like walls are located on the downstream face of the flap members and extend in the direction of the normal flow of fluid. Because the flap members 1 are designed to have their peripheral edges contact each other, these blades 7 also engage and squeeze together when the valve is closed under action of the reverse flow of fluid. The blades thus provide and insure a perfectly tight seal between each of the edges of the flaps when they come into close contact. They thus effectively and securely seal the body passage against reverse flow.

Because of the non-compressible nature of the abutting portions 5 and 6 and because of the triangular cross-section of each of the flap members, the flaps 1 cannot invert or reverse themselves to open under the force of the reversely flowing fluid. The flaps are held in the plane of the ring when they are in closed condition constituting a truly unidirectional valve.

The valve shown above can be easily made in accordance with the following methods:

A mold corresponding to the shape of the valve in its slightly open position, as seen in FIG. 2 is provided. The required fibrous reinforcement 4 is located and suspended within the mold in its radially oriented position and a stainless steel annular collar or other hard reinforcing member is inserted into the peripheral portion to reinforce the ring portion 2. A monomer mixture comprising 60 parts by weight of hydroxyethyl methacrylate, 0.25 parts of ethylene dimethacrylate, 10 parts by weight of ethanol, 15 parts by weight of a 1% aqueous solution of ammonium persulphate and 15 parts by weight of a 1% aqueous solution of sodium disulfite, is prepared and poured into the mold. The mixture is polymerized at 30°C for approximately one half hour or until the monomer mixture completes its polymerization. The completed valve is then removed from the mold, dried under atmosphere or in a suitable drying oven until approximately 40% of its liquid solvent is removed. Mold flashings and burrs are removed from the valve body and the valve is polished in the dry state. Thereafter, the valve is soaked in a physiological saline solution. The polymerized gel then swells to an extent that it contains approximately 40% of water in the equilibrium state. The reconstitution or swelling in water to its equilibrium state returns the valve body to the size in which it had as cast in the mold and prior to its being dried. That is the monomer mixture is provided with such an amount of solvent that upon the solvent's being dried or driven off from the polymerized body permits substantially an equal amount of water to take its place when soaked in water to the equilibrium state.

If it is desired to achieve an even more perfect fitting of the surfaces and contacting edges of the flap members in the closing position of the valve as shown in FIG. 1, the polymerization charge, that is the monomer mixture can be made so that the polymerized resultant body can provide a gel which when being transferred into an equilibrium condition as soaked in a physiologically saline solution, acquires a larger volume than the volume of the valve after the polymerization of the mixture is itself completed. This can be obtained according to the disclosure of Czechoslovak Pat. No. 131,839 corresponding to U.S. Pat. No. 3,499,862 by lowering the concentration of the inert solvent below the water concentration in the equilibrium swollen state. For example, if ethanol is used as the solvent it may be replaced by an equal amount of hydroxyethyl methacrylate in the example given above. The total amount of hydroxyethel methacrylate is then increased although still remaining less than 70 parts by weight. As a result the polymerized gel of the casting occupies in its equilibrium swollen state a volume larger by about 20% than it actually had immediately after the casting. As a result of this 20% increase in volume, the criticality of the casting technique and the construction of the mold does not assume great critical proportion. Thus a mold may be more inexpensively made and the casting procedure is simplified both for economy and for speed of manufacture. The 20% increase in volume under equilibrium conditions will however, insure that the contacting edges of the flap members make a perfect sealing contact so that the valve in its required closed condition actually and accurately seals the body passage in which it is placed. As a result even high levels of pressure of the fluid in the reverse flow condition will not permit the fluid to penetrate the sealed edges of the valve.

The hydrophilic gel formed from the monomer mixture above has the further advantage that it provides an antithrombogenic surface which is compatible both to the blood vessel or body passage tissues and to the blood cells themselves. The valve may thus be placed in the body passage without fear of stenosis or other damage to the body passage and without fear of damage to the fluid passing through the body. Other antithrombotic materials may be used, as for example silicone rubber which even in foamed condition has sufficient strength and elasticity for the purpose. When silicone rubber is used it may not be necessary to employ the textile reinforcement, or the stainless steel reinforcing ring since the silicone rubber has a high degree of strength and flexibility. The silicone rubber can be formed into the proper shape by pressure molding in a mold similar to that used above as is conventional and well known in this art.

It is further obvious that the structure shown in the figures, wherein four triangular shaped flap members are provided, can be modified so that the number of the flaps and their fhape may be varied as desired. As few as to flaps can be used although a higher number of flap members provides for a better division of the circular body and creates a more responsive action to fluid flow. A triangularly shaped flap is also preferred since it provides a member having only two contact edges.

It is also obvious that while the present invention has particular utility for the regulation of blood flow, it may be used to regulate flow of liquid and gases in other body portions. It may also be used in non-medical or surgical environments and may be used in technical and engineering areas of any type.

Since various modifications, changes, and embodiments have been described, and since others will be obvious to those skilled in this art, it is intended that the present disclosure be illustrative only of the present invention and not limiting of its scope.

What is claimed is:

1. A valve for regulating the flow of fluid in a body passage, comprising a valve body having an outer peripheral ring portion surrounding an interior flow passage defining a valve body inner wall and at least two interior flap portions pivotal in response to the flow of fluid therethrough, said flaps comprising a substantially polygonal shape having flexible edge portions shaped to cooperate with each other to jointly close the interior passage of said valve body when said flaps are pivoted in one direction and to open the interior passage of said valve body when said flaps are pivoted in the other direction, each of said flaps being pivotally secured to the inner wall of said peripheral ring along an axis represented by chords of said ring and having stop means located adjacent thereto for engagement with the wall of the ring portion for limiting movement of said flap to maintain said flaps closed in response to flow of fluid in the one direction.

2. The valve according to claim 1 wherein said means for limiting movement of said flaps comprise an enlarged portion integral with said flaps extending from the face of said flaps downstream of the flow of fluid in the one direction.

3. The valve according to claim 2 wherein said flaps are geometrically shaped so that their edges cooperatively abut and contact each other when said flaps are pivoted in said one direction to their limit.

4. The valve according to claim 2 wherein said flaps lie in a plane parallel to said ring portion when pivoted in said one direction to their limit.

5. The valve according to claim 2 including a peripheral wall extending about the edges of each of said flap members, said peripheral walls extending perpendicularly to the plane of said flap on the downstream side of said valve.

6. The valve according to claim 3, wherein said peripheral walls are formed of thin flexible material and are adapted to contact the wall of the correspondingly adjacent flap member.

7. The valve according to claim 2 wherein said flap members are connected to the ring portion by a hinge suspension made from flexible material to provide a continuous connection between flap and ring portion.

8. The valve according to claim 7 including a reinforcement member embedded within the ring portion and flap member and connecting the same across the hinge suspension.

9. The valve according to claim 8 wherein said reinforcement member is comprised of fibrous material oriented substantially in the radial direction.

10. The valve according to claim 2 wherein the flap member and ring portion are integrally formed of a unitary elastic material.

11. The valve according to claim 10 wherein said elastic material is a hydrophilic gel strongly swollen by water.

12. The valve according to claim 11 wherein the ring portion is provided with an annular steel reinforcing member.

* * * * *